(12) United States Patent
Buchner et al.

(10) Patent No.: US 10,029,660 B2
(45) Date of Patent: Jul. 24, 2018

(54) METHOD FOR CONTROLLING A BRAKE DEVICE IN A TRACTION VEHICLE-TRAILER COMBINATION AND BRAKE DEVICE CONTROLLED ACCORDING TO SAID METHOD

(71) Applicant: Knorr-Bremse Systeme Fuer Nutzfahrzeuge GmbH, Munich (DE)

(72) Inventors: Hermann Buchner, Aiterhofen (DE); Wolfgang Alter, Landsberg/Lech (DE); Florian Finkl, Munich (DE); Kai Arens, Munich (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 0 days.

(21) Appl. No.: 15/110,086

(22) PCT Filed: Dec. 19, 2014

(86) PCT No.: PCT/EP2014/078682
§ 371 (c)(1),
(2) Date: Jul. 6, 2016

(87) PCT Pub. No.: WO2015/104168
PCT Pub. Date: Jul. 16, 2015

(65) Prior Publication Data
US 2016/0332606 A1 Nov. 17, 2016

(30) Foreign Application Priority Data

Jan. 7, 2014 (DE) .......... 10 2014 100 069

(51) Int. Cl.
*B60T 7/20* (2006.01)
*B60T 8/17* (2006.01)
(Continued)

(52) U.S. Cl.
CPC .............. *B60T 7/20* (2013.01); *B60T 8/1708* (2013.01); *B60T 13/662* (2013.01); *B60T 13/683* (2013.01); *B60T 2260/04* (2013.01)

(58) Field of Classification Search
CPC ........ B60T 13/662; B60T 13/683; B60T 7/20; B60T 8/1708
(Continued)

(56) References Cited

U.S. PATENT DOCUMENTS

| 7,703,861 B2 | 4/2010 | Christensen et al. |
| 2010/0174451 A1* | 7/2010 | Leinung ................ B60T 17/004 701/36 |
| 2013/0158801 A1* | 6/2013 | Tober ................... B60T 8/17551 701/41 |

FOREIGN PATENT DOCUMENTS

| DE | 102005002699 | 7/2006 |
| DE | 102012008528 | 11/2013 |

(Continued)

OTHER PUBLICATIONS

English Translation: Jessen, EP 2384941 A1, Nov. 2011, European Patent Office Publication (Year: 2011).*

(Continued)

*Primary Examiner* — Nadeem Odeh
(74) *Attorney, Agent, or Firm* — Gerard Messina

(57) ABSTRACT

A method/device for controlling a traction vehicle-trailer brake device, a trailer with an unactivated service brake is detected, and when a predetermined pushing effect is reached/exceeded a trailer brake system is activated to generate a braking force when the service brake is unactivated, in which the first parameter is a) consumption of an operating medium, and/or b) torque generated by a drive machine/driven wheel, and/or c) signal representing the traction vehicle/trailer's longitudinal deceleration, and/or d) the speed/acceleration at which an activation element is (Continued)

activated toward lower velocities, and/or e) a difference/quotient of a target traction vehicle speed, and an actual traction vehicle speed is used if the traction vehicle having an infinitely variable transmission, and provides infinitely variable adjustment of the transmission ratio, and f) the control device detects that the predetermined pushing effect of the trailer is reached/exceeded if a first parameter predetermined limiting value is reached/exceeded.

29 Claims, 1 Drawing Sheet

(51) Int. Cl.
*B60T 13/66* (2006.01)
*B60T 13/68* (2006.01)

(58) Field of Classification Search
USPC .......................................................... 701/70
See application file for complete search history.

(56) References Cited

FOREIGN PATENT DOCUMENTS

| | | |
|---|---|---|
| EP | 2269880 | 1/2011 |
| EP | 2384941 | 11/2011 |

OTHER PUBLICATIONS

English Translation: Widemann, DE 102012008528 A1, Nov. 2013, German Patent Office Publication (Year: 2013).*

International Preliminary Report on Patentability dated Jul. 12, 2016 for International PCT Application No. PCT/EP2014/078682 filed Dec. 19, 2014.

International Search Report dated May 13, 2015, of the corresponding International Application PCT/EP2014/078682, filed on Dec. 19, 2014.

* cited by examiner

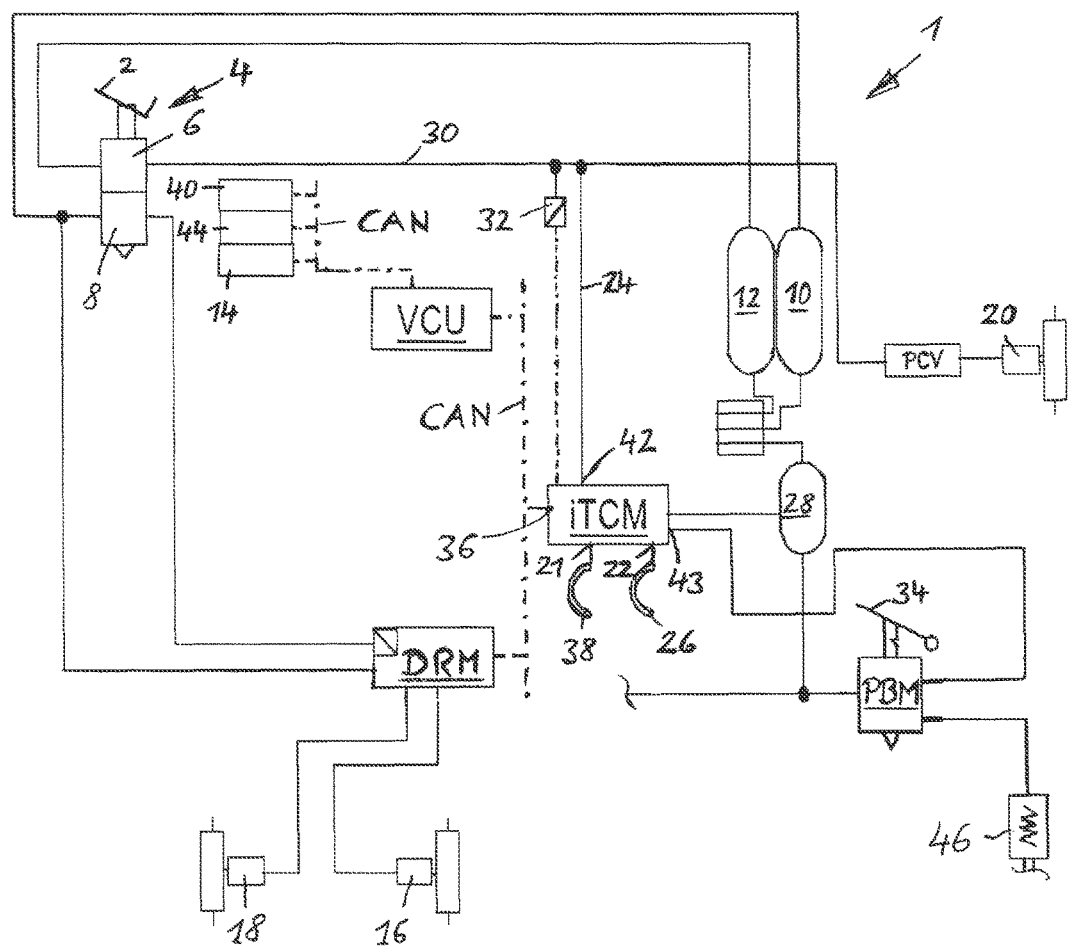

METHOD FOR CONTROLLING A BRAKE DEVICE IN A TRACTION VEHICLE-TRAILER COMBINATION AND BRAKE DEVICE CONTROLLED ACCORDING TO SAID METHOD

FIELD OF THE INVENTION

The present invention relates to a method for controlling a brake device in a traction vehicle-trailer combination, wherein a trailer which pushes onto the traction vehicle is detected by an electronic control device in a driving state with an unactivated service brake, and when a predetermined pushing effect of the trailer is reached or exceeded a brake system of the trailer is automatically activated by the control device to generate a braking force when the service brake of the traction vehicle is not activated. Furthermore, the present invention also relates to a brake device of a traction vehicle-trailer combination, controlled according to such a method.

BACKGROUND INFORMATION

Agricultural tractors which, as traction vehicles, are also configured for pulling trailers, frequently have infinitely variable transmissions, in particular hydrostatic-mechanical transmissions. Such infinitely variable transmissions make it possible to decelerate the traction vehicle solely by activating an operator control lever (joystick) in order to change the transmission ratio without the accelerator pedal or the service brake having to be activated for this purpose. Additionally or alternatively to this, in the case of traction vehicle-trailer combinations which differ from vehicles which are used agriculturally the traction vehicle-trailer combination can be decelerated without activating the service brake and solely by activating the accelerator pedal of a drive machine of the traction vehicle in the direction of relatively low velocities.

When the service brake is not activated such deceleration has the consequence that the trailer is not braked and therefore pushes in an unbraked fashion onto the traction vehicle. This can give rise to high coupling forces between the traction vehicle and the trailer and therefore to a certain extent to instability of the traction vehicle-trailer combination. In particular, driving situations which are critical or unstable in terms of vehicle movement dynamics, in particular when traveling uphill or on a negative gradient or even on roadways with a low coefficient of friction can be brought about if the pushing trailer causes the traction vehicle-trailer combination to jackknife.

As a result of increasing use of the infinitely variable transmissions described above in agricultural vehicles and as a result of the frequently encountered operator control behavior of drivers who predominantly use the infinitely variable transmission to decelerate the vehicle instead of the service brake, undesired pushing of the trailer onto the traction vehicle and situations which are critical in terms of vehicle movement dynamics occur more frequently. This situation is exacerbated by the higher maximum speeds of agricultural traction vehicles which are found nowadays. Furthermore, the engine and the transmission are loaded relatively heavily by this type of deceleration.

Taking this problem as a starting point, there are already approaches in which a pushing operation is detected on the basis of driving operation parameters and the trailer vehicle is automatically braked when a defined pushing effect is exceeded. This gives rise to a reduction of the coupling forces and therefore to stabilization of the traction vehicle-trailer combination. The parameters which are to detect a pushing operation are the engine rotational speed of the drive machine of the traction vehicle or the pressure in infinitely variable hydrostatic transmissions.

A genus-forming method is discussed in EP 2 269 880 A1. In the method, a measure for the pushing effect of the trailer and/or a parameter for detecting the pushing of the trailer onto the traction vehicle are/is determined from the difference or the quotient of the actual engine rotational speed of the traction vehicle and a predefined target engine rotational speed or the pressure ratios in a hydrostatic traction drive of the traction vehicle. In addition, the maximum braking duration of the trailer brakes during automatic braking triggered by pushing of the trailer onto the traction vehicle is limited and the braking effect of the trailer brakes is adapted as a function of the velocity.

If the pressure ratios in a hydrostatic traction drive of the traction vehicle are used as a parameter for detecting the pushing of the trailer onto the traction vehicle, this procedure can be applied only in traction vehicles which also have such a hydrostatic traction drive. Use of the engine rotational speed as a parameter has the disadvantage in agricultural vehicles with the infinitely variable transmission described above that the driver can bring about deceleration solely by activating the operator control lever (joystick) of the infinitely variable transmission in order to change the transmission ratio without, however, changing the position of the accelerator pedal and therefore the engine rotational speed. In such a case, the trailer would then be unbraked.

SUMMARY OF THE INVENTION

The present invention is based, in contrast to the above, on the object of further developing a method of the type mentioned at the beginning in such a way that it can be used more universally and ensures reliable braking of a pushing trailer.

This object may be achieved according to the invention by the features described herein.

The method according to the invention provides that the first parameter that the control device uses for detecting the pushing of the trailer onto the traction vehicle or to form this first parameter is a) the consumption of an operating medium for operating a drive machine of the traction vehicle and/or
b) the driving torque generated by a drive machine of the traction vehicle and/or the output torque at at least one driven wheel of the traction vehicle, and/or
c) a signal representing the longitudinal deceleration of the traction vehicle and/or a signal representing the longitudinal deceleration of the trailer, and/or
d) the speed and/or the acceleration at which an activation element for setting the velocity of the traction vehicle is activated toward velocities which are lower than the current velocity, and/or
e) a difference or a quotient of a target traction vehicle speed, which is predefined via an actuation element which can be activated by the driver and which has the purpose of infinitely variable adjustment of the transmission ratio and is recorded by the control device, and of an actual traction vehicle speed which is recorded by the control device is used in the event of the traction vehicle having an infinitely variable transmission with an activation element which can be activated by the driver and which has the purpose of infinitely variable adjustment of the transmission ratio, and in that f) the control device detects that the predetermined pushing effect of the trailer is reached or exceeded if the first parameter has reached, exceeded or undershot a predetermined limiting value assigned to the first parameter.

The abovementioned first parameters or the above variables or above variable used to form the first parameters or a first parameter have/has the advantage that they are often already known in brake devices of traction vehicle-trailer combinations or are input into the brake device of other systems, in particular via data buses, with the result that no additional sensor system is necessary. Therefore, for example in modern traction vehicles the fuel consumption is measured or monitored in any case. Furthermore, sensors which supply at least one of the abovementioned first parameters or variables to form these first parameters are in any case also already present in vehicle movement dynamics control systems such as ABS, traction control systems and ESP which are frequently encountered and are integrated into the brake device. The method according to the invention can therefore be implemented cost-effectively.

The inventive first parameters which can be used alternatively or else cumulatively also result in flexible application of the method for a multiplicity of traction vehicle-trailer combinations or the brake devices thereof.

The values of the first parameters or the variables which are used to form these first parameters can be fed to the control device, for example via a vehicle data bus, from corresponding sensors or from further control units such as, for example, from a brake control unit, transmission control unit etc. The control device can be of a separate configuration, integrated into another such control unit or combined therewith structurally. It is also conceivable to apportion the control routines of the method among a plurality of individual control units. The limiting values which are respectively assigned to the first parameters may be saved in characteristic diagrams which are stored in the control device.

Advantageous developments and improvements of the invention which is specified in the descriptions herein are possible by virtue of the measures disclosed in the further descriptions herein.

As a consequence of the automatic activation of the trailer brake by the control device the braking force of the trailer is particularly an open-loop or closed-loop controlled as a function of the value or absolute value of the first parameter or of the difference or quotient of the first parameter and of the predefined limiting value assigned to the first parameter. Therefore, for example the braking force of the trailer is adjusted to a higher value the greater the pushing effect of the trailer onto the traction vehicle, and to a lower value the smaller the pushing effect. The limiting value or limiting values is/may be stored here in one or more characteristic diagrams of the control device.

According to one development, the predetermined limiting value, assigned to the first parameter, is varied or adapted by the control device as a function of at least one driving operation condition. The parameter-related limit from which the trailer is automatically braked can therefore be adjusted as a function of the current driving operation conditions. For this purpose, for example, corresponding characteristic diagrams, in which the dependence of the limiting value on one or more driving operation conditions is saved, are stored in the control device. In this context, the at least one driving operation condition can include a steering angle of the traction vehicle, a negative gradient angle or an inclination angle of the route being traveled on by the traction vehicle-trailer combination and/or a state of load of the traction vehicle and/or the trailer and/or a roadway coefficient of friction of the route being traveled on. By virtue of this measure, the limiting value is adapted to the current driving situation. For example, the limiting value and therefore the tolerable running up or pushing of the trailer onto the traction vehicle is reduced the greater the load of the trailer. The same applies to downhill travel or travel on negative gradients during which the tendency to push onto the traction vehicle increases greatly for relatively large angles of negative gradient. A relatively large steering angle of the traction vehicle when pushing tendency of the trailer is present results in an increased tendency of the traction vehicle-trailer combination to jackknife, with the result that this tendency is countered by decreasing the respective limiting value and therefore the earlier braking of the trailer and extending the traction vehicle-trailer combination. Furthermore, the current roadway coefficient of friction can be determined, for example, indirectly by the signals of wheel speed sensors relating to the brake slip or drive slip in the scope of an ABS/traction control system. In the case of a low roadway coefficient of friction, the respective limiting value is then, for example, decreased and increased in the case of a high roadway coefficient of friction.

With respect to feature a), the consumption of fuel (for example fossil fuel, diesel fuel, spark ignition engine fuel) in the case of an internal combustion engine and/or the consumption of electric energy (current, voltage) of an electric energy source in the case of an electric drive machine is used as the consumption of operating medium of the drive machine of the traction vehicle. A combination of both in the case of a hybrid drive is also conceivable. The consumption data is transmitted to the control device, for example via a vehicle data bus to which a drive control unit supplying this consumption data is connected. The control device may be configured in such a way that it detects that a predetermined pushing effect of the trailer is reached or exceeded if the consumption of the operating medium of the drive machine of the traction vehicle has undershot an assigned predetermined limiting value because a reduction in consumption or a negative consumption gradient constitutes an indication of the accelerator pedal being released or deceleration.

With respect to feature b), the control device may be embodied in such a way that it detects that the predetermined pushing effect of the trailer is reached or exceeded if the driving torque generated by the drive machine of the traction vehicle and/or the output torque at at least one driven wheel of the traction vehicle undershoots an assigned predetermined limiting value. The driving torque of the drive machine is to be understood here as being the torque at an output shaft of the drive machine, for example at a crankshaft of an internal combustion engine or at a rotor shaft of an electric motor. However, in contrast to this, the output torque at at least one driven wheel is lower than the driving torque of the drive machine owing, for example, to friction losses or to branching off of torque to consumers or additional devices of the traction vehicle-trailer combination. In other words, the driving torque or output torque is monitored to determine whether it undershoots a predetermined limiting torque because this involves a deceleration of the traction vehicle, for example caused by release of the accelerator pedal. Instead of torques, it is, of course, also possible to use driving forces or output forces of the drive machine. Corresponding sensors are provided for measuring the torques or forces or are already present for other purposes.

With respect to feature c), the control device may be configured in such a way that it detects that the predetermined pushing effect of the trailer is reached or exceeded if the signal representing the longitudinal deceleration of the traction vehicle and/or the signal representing the longitudinal deceleration of the trailer undershoots an assigned predetermined limiting value. In this case, the longitudinal deceleration of the traction vehicle and/or the trailer is therefore monitored directly because this variable constitutes a measure of the pushing tendency of the trailer. The term "undershooting of the limiting value" is to be understood as meaning values for the longitudinal deceleration which are lower than the limiting value in question. For example, a longitudinal deceleration of minus 3 g is less than the predefined limiting value of minus 2 g.

For this purpose, a longitudinal acceleration sensor for generating the signal representing the longitudinal deceleration of the trailer can be arranged in or on the trailer, and/or a longitudinal acceleration sensor for generating the signal representing the longitudinal deceleration of the traction vehicle can be arranged in or on the traction vehicle. Alternatively or additionally, the signal representing the longitudinal deceleration of the traction vehicle and/or the signal representing the longitudinal deceleration of the trailer can be generated on the basis of signals of wheel speed sensors on wheels of the traction vehicle and/or of the trailer.

With respect to feature d), the control device may be embodied in such a way that it detects that the predetermined pushing effect of the trailer is reached or exceeded if the speed and/or the acceleration, with which the activation element for adjusting the velocity of the traction vehicle, for example an accelerator pedal or a joystick as has been mentioned at the beginning, is activated toward velocities which are lower compared to the current velocity, exceeds an assigned predetermined limiting value. For the case mentioned in feature e) according to which the traction vehicle has an infinitely variable transmission with an activation element (joystick) which can be activated by a driver and has the purpose of infinitely variable adjustment of the transmission ratio, said activation element (joystick) may then be used as the activation element for adjusting the velocity of the traction vehicle. In other words, the speed and/or the acceleration at which the activation element for adjusting the velocity of the traction vehicle is activated are/is monitored because adjustment of this activation element from a current velocity to lower speeds always causes longitudinal deceleration of the traction vehicle and therefore running on of the trailer. Corresponding sensors, for example rotation angle sensors for measuring the speed and/or the acceleration at which the activation element for adjusting the velocity of the traction vehicle is activated are to be provided, or are already present, on the activation element.

The brake system of the traction vehicle and/or the brake system of the trailer can be of any desired type and can be activated, in particular, electrically, hydraulically, pneumatically, electro-hydraulically or electro-pneumatically.

The traction vehicle particularly may be an agricultural vehicle with an infinitely variable transmission, and the brake system of the traction vehicle is activated hydraulically, and the brake system of the trailer is activated pneumatically, wherein a hydraulic-pneumatic interface is provided between the brake system of the traction vehicle and the brake system of the trailer, in particular a trailer control valve or trailer control module which converts, in the case of service braking operations, a hydraulic pressure generated for the hydraulic brake system of the traction vehicle into a pneumatic pressure for the pneumatic brake system of the trailer.

According to one development, the traction vehicle can be an all-wheel drive traction vehicle, wherein after the control device has detected that the predetermined pushing effect of the trailer has been reached or exceeded, an all-wheel drive which has not been activated until then is activated. For example, the type of drive on the traction vehicle is then switched over from two-wheel drive to four-wheel drive. The background to this measure is that as a result the drag torque of the traction vehicle, for example owing to the braking effect of the transmission, is distributed to all wheels and therefore the braking torque or the braking force per wheel is reduced, as a result of which each wheel can then absorb larger lateral forces, which contributes to the driving stability and makes pushing of the trailer onto the traction vehicle less critical. It is also conceivable to have a chronological sequence of the automatic all-wheel activation and the automatic braking of the trailer after the detection that the trailer is pushing excessively onto the traction vehicle. For example, the all-wheel drive of the traction vehicle could be activated first, and the brake system of the trailer could then be activated or else the all-wheel drive of the traction vehicle could be activated and the brake system of the trailer could be activated at the same time.

According to one particular embodiment, in addition to a predetermined pushing effect of the trailer being reached or exceeded as a precondition for automatic braking of the trailer when the service brake of the traction vehicle is not activated, an additional critical situation in terms of vehicle movement dynamics with respect to the pushing of the trailer onto the traction vehicle has to be detected as a further precondition by the control device. The background here is that in the previous prior art automatic braking of the trailer was made dependent exclusively on the pushing of the trailer onto the traction vehicle, without, however, taking into account here the current driving operation situation or checking whether braking of the trailer is actually necessary. In certain cases, for example in the case of straight travel and in the case of a roadway with a high coefficient of friction, pushing of the trailer onto the traction vehicle to a limited extent may not be dangerous. If the trailer nevertheless is braked in such a case, this could result in wear of the trailer brakes which is actually avoidable.

In other cases, for example if the trailer pushes onto the traction vehicle in the case of cornering at a low roadway coefficient of friction, this could constitute a danger in respect of driving instability and could lead, in particular, to jackknifing of the traction vehicle-trailer combination.

Therefore, in addition to the tendency of the trailer to push onto the traction vehicle per se or additionally, further factors may be taken into account which can cause situations which are critical in terms of vehicle movement dynamics and which are included in an evaluation as to whether there is in fact a necessity to brake automatically the trailer which is pushing onto the traction vehicle. According to the advantageous development of the invention which is described here, the current situation of the traction vehicle-trailer combination in terms of vehicle movement dynamics is therefore additionally also included in the evaluation, and therefore the danger potential of the situation in terms of vehicle movement dynamics is checked and detected.

An additional critical situation in terms of vehicle movement dynamics with respect to the pushing of the trailer onto the traction vehicle may be detected by the control device as a function of at least one of the following second parameters:

the steering angle of the traction vehicle, the yaw rate of the traction vehicle and/or of the trailer, the wheel rotational speed and/or the wheel acceleration of at least one wheel of the traction vehicle and/or of the trailer, the wheel slip of at least one wheel of the traction vehicle and/or the trailer, the lateral acceleration of the traction vehicle and/or of the trailer, the velocity of the traction vehicle-trailer combination, wherein the control device detects the additional critical situation in terms of vehicle movement dynamics with respect to the pushing of the trailer onto the traction vehicle when at least one of the specified second parameters reaches, exceeds or undershoots a predetermined and assigned limiting value.

In contrast to the embodiment described above in which the limiting value of the first parameter is varied or adapted as a function of the current driving operation conditions, in the embodiment described here it is checked whether in addition the current driving operation conditions, represented by at least one second parameter, are critical. This is done by checking whether at least one of the second parameters reaches, exceeds or undershoots a predetermined and assigned limiting value.

As has already been explained by way of example above, even slight pushing of the trailer onto the traction vehicle at a large steering angle of the traction vehicle during cornering and in the case of a low roadway coefficient of friction can easily bring about jackknifing of the traction vehicle-trailer combination and therefore a typical situation of a traction vehicle-trailer combination which is critical in terms of vehicle movement dynamics. If it has therefore already been determined that owing to the magnitude or the absolute value of the first parameter (for example activation speed of the joystick of the infinitely variable transmission) the trailer has a tendency to push onto the traction vehicle, it is additionally checked whether the steering angle of the traction vehicle exceeds a predetermined limiting value and, for example, on the basis of the wheel rotational speed signals or wheel slip values whether the current roadway coefficient of friction undershoots a predetermined limiting value. If this is, for example, the case in a cumulative fashion, the trailer is only braked then.

A further indicator of situations which are critical in terms of vehicle movement dynamics is the yaw rate of the traction vehicle, by which jackknifing of the traction vehicle-trailer combination can also be detected when an assigned limiting value is exceeded. Instead of the yaw rate, it is also possible to monitor its change over time. The yaw rate can be determined here by a yaw rate sensor or else by suitably arranged acceleration sensors. Such sensors are already present in any case if the traction vehicle has an ESP (electronic stability program).

It is also conceivable to use the wheel slip of the wheels of the traction vehicle to detect a situation which is critical in terms of vehicle movement dynamics, this is because the deceleration effect of the transmission can already be so high in the pushing operation that brake slip occurs at least on the wheels of the traction vehicle. It is therefore checked whether the wheel slip and/or the change over time in the wheel speed of at least one wheel of the traction vehicle exceeds a predefined limiting value. If this is the case, the traction vehicle-trailer combination is extended by braking the trailer.

Furthermore, a difference or a quotient of a target lateral acceleration or target longitudinal acceleration and a determined actual lateral acceleration or actual longitudinal acceleration of the traction vehicle and/or of the trailer which is expected with the present driving operation conditions can be used as a second parameter and compared with a limiting value. If, for example, such a difference exceeds a predefined limiting value, the trailer is automatically braked.

It is self-evident here that a plurality of second parameters can be checked in parallel with respect to their assigned limiting values being reached, exceeded or undershot, and that the trailer brakes are not applied until, for example, a plurality of conditions are met cumulatively.

In addition, as a consequence of the automatic activation of the trailer brake by the control device the braking force of the trailer could be open-loop or closed-loop controlled as a function of the value or the absolute value of the second parameter or of the difference or the quotient of the second parameter and of the predefined limiting value assigned to the second parameter. The limiting values are stored, for example, in characteristic diagrams of the control device.

In order to adapt the trailer braking forces or for the open-loop or closed-loop control thereof, the control device may vary the time profile and/or the amplitude (absolute value) and/or the frequency of the braking force. In particular, the automatic activation of the trailer brake is brought about by pulsed activation of the trailer brake by the control device. Pneumatic or electro-pneumatic brake systems of trailers have, for example, solenoid valves or relay valves which can then be actuated in an electrically pulsed fashion by the control device.

If the control device in which the control routines of the method according to the invention are implemented is formed by the control unit of an electro-pneumatic trailer control module of the traction vehicle-trailer combination, with which module the trailer brakes are controlled in any case, no additional expenditure on hardware is then necessary.

The invention relates not only to the method described above for controlling a brake device of a traction vehicle-trailer combination but also to a brake device of a traction vehicle-trailer combination which is controlled according to a method described above.

As already mentioned above, in this context the brake system of the traction vehicle and/or the brake system of the trailer can be activated electrically, hydraulically, pneumatically, electro-hydraulically or electro-pneumatically.

In order to carry out the method described above, for example the control device is configured in such a way that it receives and processes signals representing the longitudinal and/or lateral deceleration of the trailer from an acceleration sensor arranged on the trailer or from wheel speed sensors on wheels of the trailer and/or signals representing the longitudinal and/or lateral deceleration of the traction vehicle from an acceleration sensor arranged on the traction vehicle or from wheel speed sensors on wheels of the traction vehicle and/or signals representing the yaw rate of the traction vehicle from a yaw rate sensor or a plurality of acceleration sensors arranged on the traction vehicle and/or signals representing the yaw rate of the trailer from a yaw rate sensor or a plurality of acceleration sensors arranged on the trailer or from sensors which the activation speed and/or the activation acceleration with which an activation element for adjusting the velocity of the traction vehicle is activated toward velocities which are lower than the current velocity.

If the brake system of the traction vehicle is activated pneumatically or electro-pneumatically or constitutes an electronically regulated brake system (EBS) and has at least one pressure regulating module for regulating the traction vehicle brake pressure and an electro-pneumatic trailer control module for regulating the trailer brake pressure, an acceleration sensor for measuring longitudinal acceleration and/or lateral acceleration or the yaw rate and/or a yaw rate sensor can be integrated into such a pressure regulating module or trailer control module. However, these sensors could also be integrated into the control device.

If the traction vehicle is, for example, an agricultural vehicle, and the brake system of the traction vehicle is activated hydraulically and the brake system of the trailer is activated pneumatically, a hydraulic-pneumatic interface can be provided between the brake system of the traction vehicle and the brake system of the trailer, which interface converts, in the case of service braking operations, a hydraulic pressure generated for the hydraulic brake system of the traction vehicle into a pneumatic pressure for the pneumatic brake system of the trailer. However, the invention is not restricted to such agricultural vehicles but instead extends to all types of vehicles, in particular also to passenger vehicles, utility vehicles, or heavy utility vehicles.

In particular, the traction vehicle can be an all-wheel drive traction vehicle, wherein the control device is, as has already been explained above, configured in such a way that after it has been detected that the predetermined pushing effect of the trailer has been reached or exceeded, said control device activates the all-wheel drive which has not been activated until then.

The control device can be formed by a separate control unit or else by an electronic control unit which is already present, in particular by a vehicle control unit, a brake control unit of the brake device or by the control unit of an electro-pneumatic trailer control module of the traction vehicle-trailer combination.

The method described above is explained only for the case of forward travel and which may be for the case of forward travel above a predefined minimum speed.

Advantageous developments of the invention can be found in the descriptions herein, the description and the drawings. The advantages of features and of combinations of a plurality of features which are specified in the introduction to the description are merely exemplary and can come into effect alternatively or cumulatively without the advantages necessarily having to be achieved by embodiments according to the invention.

Further features can be found in the drawings, in particular the illustrated geometries and the relative dimensions for a plurality of components with respect to one another and their relative arrangement and operative connection. The combination of features of different embodiments of the invention or of features of different descriptions herein may also differ from the selected back-references of the descriptions herein and is herewith suggested. This also relates to features which are illustrated in separate drawings or specified in the description thereof. These features can also be combined with features of different descriptions herein. Features for other embodiments of the invention which are disclosed in the descriptions herein can also be dispensed with.

Identical or identically acting components and assemblies are respectively denoted by the same reference numbers in different embodiments.

An exemplary embodiment of the invention is illustrated below in the drawing and explained in more detail in the following description.

BRIEF DESCRIPTION OF THE DRAWING

The FIGURE shows a schematic illustration of a brake system of a traction vehicle as part of a brake device of a traction vehicle-trailer combination which is operated according to the method according to the invention.

DETAILED DESCRIPTION

The FIGURE illustrates an electro-pneumatic brake system 1 of a traction vehicle as part of a brake device of a traction vehicle-trailer combination which is operated according to the inventive method.

For a service braking operation, a front axle pressure and a rear axle pressure are modulated in accordance with activation of a foot pedal 2 by a two-channel foot brake module 4 in a front axle channel 6 and in a rear axle channel 8 by a separate compressed air reservoir 10, 12 in each case on the basis of a reservoir pressure. Furthermore, the foot brake module 4 also comprises an electrical channel 14 which inputs an electrical braking request signal into a vehicle control unit VCU via a vehicle data bus CAN as a function of the activation of the foot pedal 2, which vehicle control unit VCU subsequently actuates, via the vehicle data bus CAN, an, for example, two-channel pressure regulating module DRM for the rear axle which pressure regulating module DRM contains for each channel—right and left channels—solenoid valves (inlet valve, outlet valve, backup valve) and may also include a relay valve as well as a pressure sensor in order to apply a corresponding brake pressure in a brake cylinder 16 of the right-hand wheel and in a brake cylinder 18 of the left-hand wheel of the rear axle as a function of the electrical actuation of said pressure sensor by the vehicle control unit VCU. Only in the event of a failure of the electric brake circuit does the rear axle pressure which is modulated by the foot brake module 4 in the rear axle channel 8 come into effect in the formation of the brake pressure at the rear axle by a backup solenoid valve which is integrated into the pressure regulating module DRM.

The pressure regulating module DRM also contains a separate control unit in order, for example, to be able to carry out a brake slip control operation (ABS) at the respective rear wheel. So that an increase in pressure can also take place, the pressure regulating module DRM is connected to the compressed air reservoir 10 for the rear axle.

In contrast, a pressure regulating module is not present at the front axle but instead a separate ABS pressure control valve PCV is present for each front wheel, the said ABS pressure control valve PCV applying the front axle pressure, modulated by the foot brake module 4, to brake cylinders 20 of the front axle when the front wheels are experiencing brake slip in a permitted fashion, and temporarily lowers or maintains this front axle pressure when the front wheels are experiencing brake slip in a non-permitted fashion. For the sake of clarity, the figure shows only one brake cylinder 20 for a wheel of the front axle, which brake cylinder 20 is connected to the front axle channel 6 of the foot brake module 4 via a pneumatic line 30 in which the ABS pressure control valve PCV is arranged.

A further pneumatic line 24 branches off from the pneumatic line 30 for the front axle channel 6 and opens into a pneumatic control inlet 42 of an electro-pneumatic trailer control module iTCM®, which inverts in a known fashion the control pressure present at its pneumatic control inlet 42, here, for example, the front axle pressure, and modulates a corresponding trailer brake pressure at its pressure outlet 22 which is connected to the "brake" 26 coupling head for the trailer. Furthermore, the trailer control module iTCM® is connected to a compressed air reservoir 28 for the trailer, and a further pressure outlet 21 is connected to a "reservoir" coupling head 38.

The electro-pneumatic trailer control module iTCM® contains local intelligence in form of a separate control unit which is informed about the front axle pressure prevailing in the pneumatic line 30 for the front axle channel 6 by a pressure sensor 32 arranged in this pneumatic line 30.

Finally, a parking brake module PBM is connected to a further pneumatic control inlet 43 of the trailer control module iTCM® and inputs into the control inlet 43 a pneumatic parking brake request signal for the trailer brakes, which parking brake request signal is adjusted at the parking brake module PBM, for example manually by a parking brake lever 34. Furthermore, the parking brake module PBM is connected to spring-loaded brake cylinder 46 of the traction vehicle, in order to vent the latter in order to apply the brake and ventilate it in order to release the brake.

In addition, the trailer control module iTCM® has a CAN interface 36 via which its separate control unit communicates inter alia with the vehicle control unit VCU and receives relevant vehicle information and the pressure request of the service brake as an electrical signal.

In the normal undisrupted driving operation, the foot brake module 4 signals, by its electrical circuit 14, the brake target pressure as an electronic pressure request to the vehicle control unit VCU which processes the pressure request and modulates it via the vehicle data bus CAN to the trailer control module iTCM® which is constructed in an analogous fashion to a pressure regulating module DRM and modulates, as a function of the pressure request, a trailer brake pressure to the "brake" coupling head 26, wherein the trailer control module has for this purpose in turn an inlet solenoid valve, an outlet solenoid valve and a relay valve. The front axle pressure of the front axle channel 6 which is present at the pneumatic control inlet 42 does not come into effect until the electrical circuit described above has failed and an integrated backup solenoid valve opens.

The "brake" coupling head 26 is coupled to a trailer-side pneumatic line (not shown here for reasons of scale) which is connected to a trailer-side trailer control valve (not shown here either) in order to generate a brake pressure for the trailer brakes as a function of the pressure applied by the traction vehicle.

In the event of a fault, i.e. in the event of a failure of the electrical circuit 14, the pressure request which is present at the pneumatic control port 42 is used as the target pressure. In this context, the trailer control module iTCM® functions as a relay valve. The parking brake pressure request at the control port 43 is modulated in inverted fashion, i.e. if there is no pressure present at the control port 43, corresponding pressure is modulated at the pressure outlet 22.

According to an embodiment which is not shown here, the pressure regulating module DRM and the pressure control valves PCV can also be dispensed with, so that the brake cylinders of the rear axle 16, 18 are actuated directly by the rear axle channel 8, and the brake cylinder 20 of the front axle are actuated directly by the front axle channel 6 of the foot brake module 4.

The electro-pneumatic brake device for traction vehicle-trailer combinations which is described above and is sufficiently well known is then modified in such a way that it can be controlled by the method described above.

For this purpose, the control routines of the method may be implemented in the vehicle control unit VCU, with the result that when the service brake is not activated and when it is detected that the trailer is pushing onto the traction vehicle and that a predetermined pushing effect of the trailer has been reached or exceeded, the trailer brakes are automatically applied on the basis of these control routines. In this context, the electrical channel of the trailer control module iTCM®, which is connected to the vehicle data bus CAN by the CAN interface 36 and can receive the braking request of the vehicle control unit VCU for the trailer via the data bus CAN, is used. The vehicle control unit VCU itself receives, via the vehicle data bus CAN, the signals from external sensors (for example sensor for engine rotational speed, longitudinal and lateral acceleration sensors 44, yaw rate sensor etc.) whose signals are necessary for the execution of the method and which can also be integrated in other components such as, for example, in the pressure regulating module DRM of the rear axle and/or in the trailer control module iTCM®.

Alternatively, the control routines of the method can also be implemented in the control unit of the electro-pneumatic trailer control module iTCM®.

The list of reference numbers is as follows:
1 Brake system
2 Foot pedal
4 Foot brake module
6 Front axle channel
8 Rear axle channel
10 Compressed air reservoir
12 Compressed air reservoir
14 Electrical channel
16 Brake cylinder
18 Brake cylinder
20 Brake cylinder
21 Pressure outlet
22 Pressure outlet
24 Pneumatic line
26 "Brake" coupling head
28 Compressed air reservoir
30 Pneumatic line
32 Pressure sensor
34 Parking brake lever
36 CAN interface
38 "Reservoir" coupling head
40 Sensor
42 Control port
43 Control port
44 Sensor
46 Spring-loaded brake cylinder

The invention claimed is:

1. A method for controlling a brake device in a traction vehicle-trailer combination, the method comprising:
   detecting, by an electronic control device, the trailer which pushes onto the traction vehicle in a driving state with an unactivated service brake; and
   automatically activating, by the control device, when a predetermined pushing effect of the trailer on the traction vehicle is reached or exceeded, a brake system of the trailer, so as to apply a braking force when the service brake of the traction vehicle is not activated;
   wherein a first parameter that the control device uses for detecting the pushing of the trailer onto the traction vehicle includes at least one of:
   a) a consumption of an operating medium for operating a drive machine of the traction vehicle,
   b) at least one of a driving torque generated by the drive machine of the traction vehicle and an output torque at least one driven wheel of the traction vehicle, c) at least one of a signal representing a longitudinal deceleration of the traction vehicle and a signal representing a longitudinal deceleration of the trailer,
d) at least one of a speed and an acceleration at which an activation element for setting a velocity of the traction vehicle is activated toward velocities which are lower than a current velocity,
e) a difference or a quotient of a target traction vehicle speed, which is predefined via an actuation element which can be actuated by a driver and which has the purpose of infinitely variable adjustment of a transmission ratio and is recorded by the control device, and an actual traction vehicle speed which is recorded by the control device is used in an event of the traction vehicle having an infinitely variable transmission with the actuation element which can be activated by the driver and which has the purpose of infinitely variable adjustment of the transmission ratio, and
f) the control device detects that the predetermined pushing effect of the trailer is reached or exceeded when, depending on the first parameter, the first parameter has reached, exceeded or undershot a predetermined limiting value assigned to the first parameter;
wherein, in addition to the predetermined pushing effect of the trailer being reached or exceeded as the precondition for automatic braking of the trailer when the service brake of the traction vehicle is not activated, an additional vehicle movement dynamic situation occurs with respect to the pushing of the trailer onto the traction vehicle and must also be detected by the control device.

2. The method of claim 1, wherein as a consequence of the automatic activation of the trailer brake by the control device the braking force of the trailer is open-loop or closed-loop controlled as a function of a value or absolute value of the first parameter or of a difference or quotient of the first parameter and of the predefined limiting value assigned to the first parameter.

3. The method of claim 1, wherein the predetermined limiting value, assigned to the first parameter, is varied by the control device as a function of at least one driving operation condition.

4. The method of claim 3, wherein the at least one driving operation condition includes at least one of
a steering angle of the traction vehicle,
a negative gradient angle or an inclination angle of a route being traveled on by the traction vehicle-trailer combination,
a state of load of at least one of the traction vehicle and the trailer, and
a roadway coefficient of friction of the route being traveled on.

5. The method of claim 1, wherein at least one of a fuel and an electric energy of an electric energy source is used as the operating medium of the drive machine of the traction vehicle.

6. The method of claim 1, wherein the control device detects that the predetermined pushing effect of the trailer is reached or exceeded when the consumption of the operating medium of the drive machine of the traction vehicle has undershot an assigned predetermined limiting value.

7. The method of claim 1, wherein the control device detects that the predetermined pushing effect of the trailer is reached or exceeded when at least one of the speed and the acceleration, with which the activation element for adjusting the velocity of the traction vehicle is activated toward velocities which are lower compared to the current velocity, exceeds an assigned predetermined limiting value.

8. The method of claim 1, wherein in the event of the traction vehicle having the infinitely variable transmission with the actuation element which can be activated by the driver and has the purpose of infinitely variable adjustment of the transmission ratio, said actuation element is used as the activation element for adjusting the velocity of the traction vehicle.

9. The method of claim 1, wherein the control device detects that the predetermined pushing effect of the trailer is reached or exceeded when at least one of the driving torque generated by the drive machine of the traction vehicle and the output torque at the at least one driven wheel of the traction vehicle undershoots an assigned predetermined limiting value.

10. The method of claim 1, wherein the control device detects that the predetermined pushing effect of the trailer is reached or exceeded when at least one of the signal representing the longitudinal deceleration of the traction vehicle and the signal representing the longitudinal deceleration of the trailer undershoots an assigned predetermined limiting value.

11. The method of claim 10, wherein at least one of a longitudinal acceleration sensor for generating the signal representing the longitudinal deceleration of the trailer is arranged in or on the trailer, and a longitudinal acceleration sensor for generating the signal representing the longitudinal deceleration of the traction vehicle is arranged in or on the traction vehicle.

12. The method of claim 10, wherein the at least one of the signal representing the longitudinal deceleration of the traction vehicle and the signal representing the longitudinal deceleration of the trailer are generated on the basis of signals of wheel speed sensors on at least one of wheels of the traction vehicle and of the trailer.

13. The method of claim 1, wherein at least one of a brake system of the traction vehicle and the brake system of the trailer is activated electrically, hydraulically, pneumatically, electro-hydraulically or electro-pneumatically.

14. The method of claim 13, wherein the traction vehicle is an agricultural vehicle, and the brake system of the traction vehicle is activated hydraulically, and the brake system of the trailer is activated pneumatically, wherein a hydraulic-pneumatic interface is provided between the brake system of the traction vehicle and the brake system of the trailer, which interface converts, when service braking operations occur, a hydraulic pressure generated for the hydraulic brake system of the traction vehicle into a pneumatic pressure for the pneumatic brake system of the trailer.

15. The method of claim 1, wherein the traction vehicle is an all-wheel drive traction vehicle, and in that after the control device has detected that the predetermined pushing effect of the trailer has been reached or exceeded, an all-wheel drive which has not been activated until then is activated.

16. The method of claim 15, wherein the all-wheel drive of the traction vehicle is activated, and the brake system of the trailer is then activated, or in that the all-wheel drive of the traction vehicle is activated and the brake system of the trailer is activated at the same time.

17. The method of claim 1, wherein the additional vehicle movement dynamic situation is detected by the control device as a function of at least one of the following second parameters:

a steering angle of the traction vehicle,
a yaw rate of at least one of the traction vehicle and the trailer,
at least one of a wheel rotational speed and a wheel acceleration of at least one wheel of at least one of the traction vehicle and the trailer,
a wheel slip of at least one wheel of at least one of the traction vehicle and the trailer,
a lateral or longitudinal acceleration of at least one of the traction vehicle and the trailer, and
a velocity of the traction vehicle-trailer combination,
wherein the control device detects the additional vehicle movement dynamic situation when at least one of the specified second parameters reaches or exceeds a predetermined and assigned limiting value.

18. The method of claim 1, wherein the additional vehicle movement dynamic situation includes jackknifing of the traction vehicle-trailer combination.

19. The method of claim 1, wherein as a consequence of the automatic activation of the trailer brake by the control device, the braking force of the trailer is open-loop or closed-loop controlled as a function of a value or an absolute value of the second parameter or of a difference or a quotient of the second parameter and of a predefined limiting value assigned to the second parameter.

20. The method of claim 1, wherein at least one of a time profile, an amplitude, and a frequency of the braking force are varied for the control device to perform open-loop or closed-loop control of the braking force of the trailer.

21. The method of claim 1, wherein the automatic activation of the trailer brake is brought about by pulsed activation of the trailer brake by means of the control device.

22. A brake system of a traction vehicle and a trailer, comprising:
a brake device; and
a controlling arrangement for controlling the brake device in the traction vehicle and the trailer, by performing the following:
  detecting, by an electronic control device, the trailer which pushes onto the traction vehicle in a driving state with an unactivated service brake; and
  automatically activating, by the control device, when a predetermined pushing effect of the trailer on the traction vehicle is reached or exceeded, a brake system of the trailer, so as to apply a braking force when the service brake of the traction vehicle is not activated;
wherein a first parameter that the control device uses for detecting the pushing of the trailer onto the traction vehicle includes at least one of:
  a) a consumption of an operating medium for operating a drive machine of the traction vehicle,
  b) at least one of a driving torque generated by the drive machine of the traction vehicle and an output torque at least one driven wheel of the traction vehicle,
  c) at least one of a signal representing a longitudinal deceleration of the traction vehicle and a signal representing a longitudinal deceleration of the trailer,
  d) at least one of a speed and an acceleration at which an activation element for setting a velocity of the traction vehicle is activated toward velocities which are lower than a current velocity,
  e) a difference or a quotient of a target traction vehicle speed, which is predefined via an actuation element which can be actuated by a driver and which has the purpose of infinitely variable adjustment of a transmission ratio and is recorded by the control device, and an actual traction vehicle speed which is recorded by the control device is used in an event of the traction vehicle having an infinitely variable transmission with the actuation element which can be activated by the driver and which has the purpose of infinitely variable adjustment of the transmission ratio, and
  f) the control device detects that the predetermined pushing effect of the trailer is reached or exceeded when, depending on the first parameter, the first parameter has reached, exceeded or undershot a predetermined limiting value assigned to the first parameter;
wherein, in addition to the predetermined pushing effect of the trailer being reached or exceeded as the precondition for automatic braking of the trailer when the service brake of the traction vehicle is not activated, an additional vehicle movement dynamic situation occurs with respect to the pushing of the trailer onto the traction vehicle and must also be detected by the control device.

23. The brake system of claim 22, wherein the brake system of at least one of the traction vehicle and the brake system of the trailer is activated electrically, hydraulically, pneumatically, electro-hydraulically or electro-pneumatically.

24. The brake system of claim 22, wherein the control device is configured so that it receives and processes at least one of
  signals representing at least one of the longitudinal deceleration and a lateral deceleration of the trailer from an acceleration sensor arranged on the trailer or from wheel speed sensors on wheels of the trailer,
  signals representing at least one of the longitudinal deceleration and a lateral deceleration of the traction vehicle from an acceleration sensor arranged on the traction vehicle or from wheel speed sensors on wheels of the traction vehicle,
  signals representing a yaw rate of the traction vehicle from a yaw rate sensor or a plurality of acceleration sensors arranged on the traction vehicle, and
  signals representing a yaw rate of the trailer from a yaw rate sensor or a plurality of acceleration sensors arranged on the trailer or from sensors which detect at least one of the activation speed and the activation acceleration with which the activation element for adjusting the velocity of the traction vehicle is activated toward velocities which are lower than the current velocity.

25. The brake system of claim 24, wherein the brake system of the traction vehicle is activated pneumatically or electro-pneumatically or constitutes an electronically regulated brake system (EBS) and has at least one of at least one pressure regulating module (DRM) and a trailer control module into which at least one of a longitudinal acceleration sensor, a lateral acceleration sensor, and a yaw rate sensor is integrated.

26. The brake system of claim 24, wherein at least one of a longitudinal acceleration sensor, a lateral acceleration sensor, and a yaw rate sensor is integrated into the control device.

27. The brake system of claim 24, wherein the traction vehicle is an agricultural vehicle, and the brake system of the traction vehicle is activated hydraulically and the brake system of the trailer is activated pneumatically, wherein a hydraulic-pneumatic interface is provided between the brake system of the traction vehicle and the brake system of the trailer, which interface converts, when service braking operations occur, a hydraulic pressure generated for the hydraulic brake system of the traction vehicle into a pneumatic pressure for the pneumatic brake system of the trailer.

28. The brake system of claim 22, wherein the traction vehicle is an all-wheel drive traction vehicle, and in that the control device is configured so that after it has been detected that the predetermined pushing effect of the trailer has been reached or exceeded, said control device activates the all-wheel drive which has not been activated until then.

29. The brake system of claim 22, wherein the control device includes a vehicle control unit (VCU), a brake control unit of the brake device or a control unit of an electro-pneumatic trailer control module.

* * * * *